W. H. LAWSON.
STEP BEARING.
APPLICATION FILED DEC. 15, 1909.
1,012,662.
Patented Dec. 26, 1911.
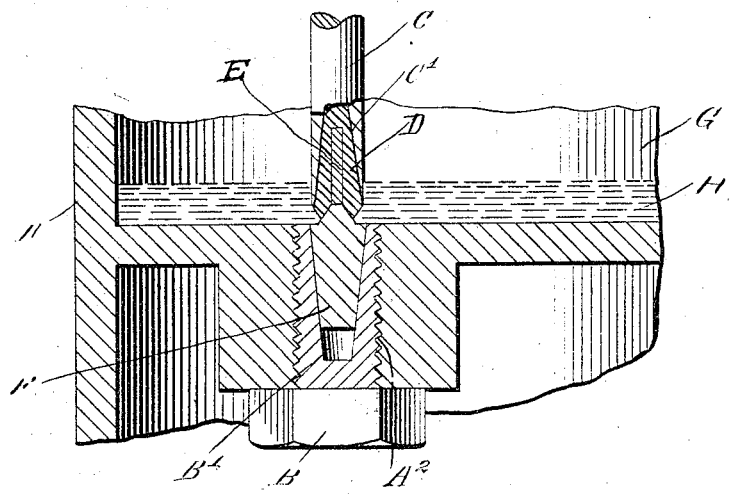
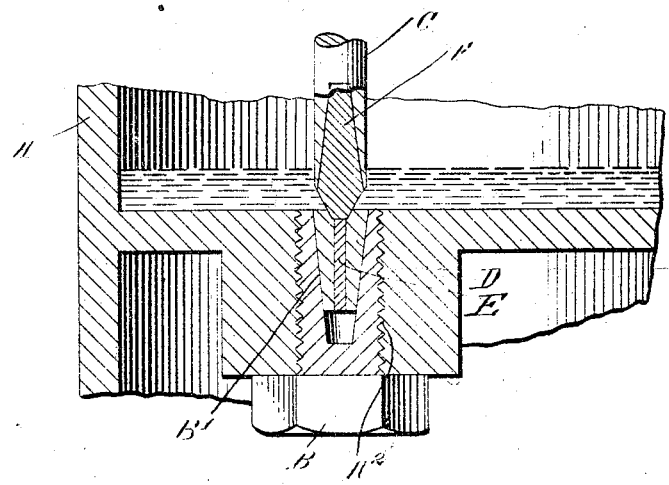
WITNESSES
INVENTOR
Welcome H. Lawson
BY
Frank W. Ashley
ATTORNEYS

UNITED STATES PATENT OFFICE.

WELCOME H. LAWSON, OF POUGHKEEPSIE, NEW YORK.

STEP-BEARING.

1,012,662. Specification of Letters Patent. Patented Dec. 26, 1911.

Application filed December 15, 1909. Serial No. 533,129.

*To all whom it may concern:*

Be it known that I, WELCOME H. LAWSON, a citizen of the United States, and a resident of Poughkeepsie, in the county of Dutchess and State of New York, have invented certain new and useful Improvements in Step-Bearings, of which the following is a specification.

My invention relates to step bearings and is particularly designed for use with machines of high speed.

The object of my invention is to provide a bearing in which the parts in contact may be quickly and cheaply renewed, in which the parts may be hardened at a low cost and in which the surfaces in contact may be lubricated in a simple and efficient manner.

Referring to the drawings which form a part of this specification, Figure 1 is a vertical sectional view through a part of the frame of a machine and through my improved bearing which is located therein. Fig. 2 is a similar view showing the elements of the bearings in reversed position.

A, indicates the lower end of the frame of a machine such for illustration as a milk separator and is provided with a threaded opening $A^2$ in which is fitted and secured screw B, the upper end of which is recessed to form a cone shaped bearing surface B'.

Referring to Fig. 1, F indicates a bearing element which is held by friction in the recess B' and is provided with a conical top portion which serves as the bearing surface for the lower end of the shaft C.

D indicates the bearing element which is fitted in a cone shaped recess C' in the lower end of shaft C and the outer surface of which is of the same formation and dimension as the outer surface of the element F so that the element D and element F are interchangeable relative to the shaft C and screw B.

The element D is provided with a central recess in which is located a lubricating metal such as metallic lead, or graphite might be used if preferred.

G indicates a chamber located in the lower end of the machine and H indicates oil therein for lubricating the surfaces of the bearing elements.

In operation, in case the surfaces of the bearing elements should run dry and friction should cause the said elements to heat, the metal E having a greater co-efficient of expansion than the metal which holds it, will expand sufficiently to permit oil to flow between the surfaces of the bearing to effect a renewal of the lubrication. The spindles or shafts of the machine of the character referred to run at a very high speed usually six to eight thousand revolutions per minute and in practice these shafts lift from their bearing surfaces quite frequently which permits the oil to flow freely between the surfaces of the bearings, but cases have occurred where, due to the high speed of the shaft, the oil has been unable to flow between the surfaces and the bearings would heat. In this case the metal E has been found to expand sufficiently to raise the shaft C far enough from the bearing surface to permit the oil to flow between the bearing surfaces to effect lubrication.

I claim:

1. A machine having an oil chamber, a screw having a removable bearing element located in one end thereof, a shaft having a removable bearing element located in one end thereof, and in contact with said first named bearing element, one of said elements having a recess therein and a metallic lubricating material located in said recess, for the purpose set forth.

2. A step bearing comprising a screw having a recess in one end thereof, a bearing element located in said recess, a shaft having a recess similar in form to the recess in said screw, a bearing element located in said recess and in direct contact with said first bearing element, one of said bearing elements having a recess in which is located a lubricant such as soft metal or graphite having a greater co-efficient of expansion than that of said elements.

3. A step bearing comprising a screw having a recess in one end thereof, a bearing element located in said recess, a shaft having a recess similar in form to the recess in said screw, a bearing element located in said recess and in direct contact with said first bearing element, one of said bearing elements having a recess in which is located a metal having a greater co-efficient of expansion than that of said elements.

4. A step bearing comprising two bearing elements in direct contact, one of which is provided with a central recess in which is located a piece of lubricating material having a greater co-efficient of expansion than that of said elements, for the purpose set forth.

5. A step bearing comprising two bearing elements, one bearing element having a cup shaped end and the other bearing element having its end formed to fit into said cup shaped end, one of said bearings having a recess in which is located a piece of expansible material having a greater coefficient of expansion than that of said bearing elements, and in contact with said elements, for the purpose set forth.

Signed at New York city, in the county of New York and State of New York, this 10th day of December, A. D. 1909.

WELCOME H. LAWSON.

Witnesses:
FRANK M. ASHLEY,
MINNIE S. MILLER.